US012692002B2

(12) United States Patent
Challenor

(10) Patent No.: US 12,692,002 B2
(45) Date of Patent: Jul. 28, 2026

(54) SEAT ASSEMBLY

(71) Applicant: Mirus Aircraft Seating Ltd., Hingham (GB)

(72) Inventor: Adam Challenor, Hingham (GB)

(73) Assignee: Mirus Aircraft Seating Ltd., Hingham (GB)

( * ) Notice: Subject to any disclaimer, the term of this patent is extended or adjusted under 35 U.S.C. 154(b) by 361 days.

(21) Appl. No.: 18/208,852

(22) Filed: Jun. 12, 2023

(65) Prior Publication Data

US 2023/0399106 A1 Dec. 14, 2023

(30) Foreign Application Priority Data

Jun. 13, 2022 (GB) ..................................... 2208636

(51) Int. Cl.
　*B64D 11/06* (2006.01)
　*B60N 2/427* (2006.01)
　*B60N 2/68* (2006.01)
(52) U.S. Cl.
　CPC .......... *B64D 11/06* (2013.01); *B60N 2/42709* (2013.01); *B60N 2/42745* (2013.01);
　　　　　　　　(Continued)
(58) Field of Classification Search
　CPC .... B60N 2002/684; B60N 2/684; B60N 2/64; B64D 11/064; B64D 11/06
　See application file for complete search history.

(56) References Cited

U.S. PATENT DOCUMENTS

| | | | | |
|---|---|---|---|---|
| 5,833,203 | A | * 11/1998 | Denis ................. | B60N 2/01525 |
| | | | | 248/220.22 |
| 7,413,371 | B2 * | 8/2008 | Arnold .................. | F16B 41/002 |
| | | | | 403/329 |

(Continued)

FOREIGN PATENT DOCUMENTS

| | | |
|---|---|---|
| CN | 110697052 A | 1/2020 |
| CN | 216467455 U | 5/2022 |

(Continued)

OTHER PUBLICATIONS

European Search Report dated Feb. 28, 2024; 13 pages.

(Continued)

*Primary Examiner* — Timothy J Brindley
(74) *Attorney, Agent, or Firm* — Black McCuskey

(57) ABSTRACT

A seat assembly comprising a seat back assembly and a support frame, the support frame comprising a first side rail and a second side rail, the seat assembly further comprising:
　a first pin connected to the first side rail of the support frame the first pin having a portion of reduced diameter;
　a second pin connected to the second side rail of the support frame;
　the seat back assembly comprising a first opening formed in a first side of the seat back assembly for receiving the first pin, and a second opening formed in a second side of the seat back assembly opposite the first side for receiving the second pin, wherein the first opening comprises a first slot having a narrow part and a wider part, the first slot being configured to receive the first pin through the wider part and retain the first pin by engagement of the portion of the pin of reduced diameter in the narrower part of the first slot; and (Continued)

a first fixing element which fixes the first pin in position in the narrower part of the first slot.

A method of assembling a seat is also disclosed.

20 Claims, 6 Drawing Sheets

(52) U.S. Cl.
CPC ........ *B64D 11/064* (2014.12); *B64D 11/0649* (2014.12); *B60N 2002/684* (2013.01)

(56) References Cited

U.S. PATENT DOCUMENTS

| | | | | |
|---|---|---|---|---|
| 8,720,847 | B2 * | 5/2014 | Reimann | B60N 2/015 |
| | | | | 297/336 |
| 11,273,743 | B1 | 3/2022 | Wilkinson | |
| 2002/0079730 | A1 | 6/2002 | Schuhmacher et al. | |
| 2014/0159449 | A1 | 6/2014 | Kamper | |
| 2015/0091342 | A1 | 4/2015 | Cailleteau | |
| 2016/0185261 | A1 | 6/2016 | Hammann | |
| 2017/0267352 | A1 | 9/2017 | Bower | |
| 2018/0022256 | A1 * | 1/2018 | Warju, II | B60N 2/36 |
| | | | | 297/354.12 |
| 2018/0043799 | A1 * | 2/2018 | Ayyash | B60N 2/22 |
| 2022/0032826 | A1 | 2/2022 | Klitting | |

FOREIGN PATENT DOCUMENTS

| | | | | | |
|---|---|---|---|---|---|
| DE | 102021205770 | A1 * | 12/2022 | | B60N 2/36 |
| EP | 1277611 | A1 * | 1/2003 | | B60N 2/366 |
| GB | 2548410 | A | 3/2016 | | |
| KR | 101330996 | B1 * | 11/2013 | | B60N 2/01508 |
| KR | 101484234 | B1 * | 1/2015 | | B60N 2/015 |
| KR | 101518627 | B1 | 5/2015 | | |
| KR | 101662552 | B1 | 10/2016 | | |
| WO | WO-2006081417 | A1 * | 8/2006 | | B60N 2/3013 |

OTHER PUBLICATIONS

International Search and Examination Report filed in the corresponding PCT Application dated Dec. 2, 2022; 7 pages.
International Search and Examination Report filed in the corresponding PCT Application dated Sep. 25, 2023; 1 page.
European Search Report (partial) dated Aug. 12, 2023; 12 pages.

* cited by examiner

Fig. 2

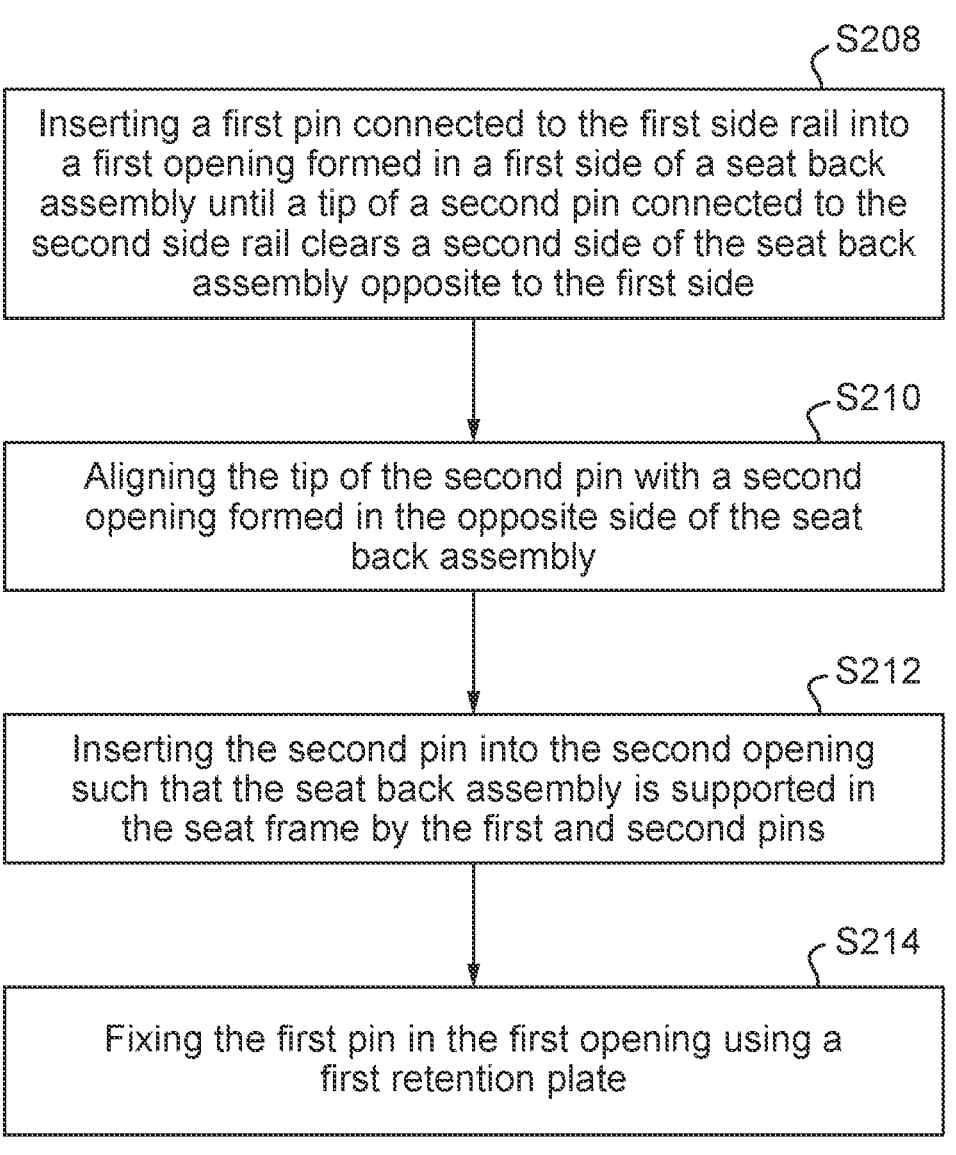

S208

Inserting a first pin connected to the first side rail into a first opening formed in a first side of a seat back assembly until a tip of a second pin connected to the second side rail clears a second side of the seat back assembly opposite to the first side

S210

Aligning the tip of the second pin with a second opening formed in the opposite side of the seat back assembly

S212

Inserting the second pin into the second opening such that the seat back assembly is supported in the seat frame by the first and second pins

S214

Fixing the first pin in the first opening using a first retention plate

SEAT ASSEMBLY

TECHNICAL FIELD

The present disclosure relates to a method of assembling a seat and is particularly, although not exclusive, concerned with a method of assembling a seat for a vehicle such as an aircraft.

BACKGROUND

Conventional aircraft seats have been designed to meet numerous requirements for safety and passenger comfort. The design of aircraft seating generally aims to reduce the weight and space occupied by the seats as well as providing seat assemblies which provide sufficient comfort and safety to an occupant.

However, these requirements can introduce complexities in the design of the seating which may make assembly of the seats within an aircraft complex and time consuming.

STATEMENTS OF INVENTION

It is desirable to provide seat assemblies and methods of assembly that reduce the time taken to assemble the seat and enable easy replacement of parts.

According to an aspect of the present disclosure, there is provided a method of assembling a seat comprising a seat back assembly and a support frame, the support frame comprising a first side rail and a second side rail, the method comprising: inserting a first pin connected to the first side rail into a first opening formed in a first side of a seat back assembly until a tip of a second pin connected to the second side rail clears a second side of the seat back assembly opposite to the first side; aligning the tip of the second pin with a second opening formed in a second side of the seat back assembly opposite to the first side; inserting the second pin into the second opening such that the seat back assembly is supported in the support frame by the first and second pins; and fixing the first pin in the first opening using a first fixing element which may engage the first pin. The fixing element may comprise a pin retention plate.

This method provides a quick and efficient way to secure the seat back assembly in the support frame. Furthermore, the seat back assembly may be provided as a separate part to the rest of the seat assembly, where the seat back is then connected to the support frame via the first pin and the second pin. Such a configuration enables the seat to be provided in parts which enables easier transportation of the seat assemblies and improves ease of assembly as smaller parts are easier to manoeuvre. This configuration of parts and the ease with which the parts are assembled (and disassembled) also enables individual parts to be easily replaced when they become worn or damaged. This reduces wastage as only individual parts need be replaced rather than entire seat assemblies.

The first opening may comprise a first slot, the first pin being inserted into a first part of the first slot and wherein, prior to the fixing step, the method may further comprise: moving the seat back assembly so that the first pin moves from the first part of the first slot to a second part of the first slot in the first side of the seat back assembly; and wherein the method may further comprise fixing the first pin at the second part of the first slot by moving the first fixing element into an engaged position.

In this way, the pin may be efficiently secured to the seat back assembly by engagement of the pin within the slot.

Furthermore, the second part of the slot when the seat back assembly is in an upright position may be located at the top of the opening, so that the seat back assembly is effectively hung from the pin, thereby reducing the strain on the first fixing element.

The method may further comprise inserting the first pin and the second pin when the seat back assembly is arranged substantially perpendicular to the first side rail and the second side rail of the support frame, and rotating the seat back assembly to a substantially upright position in which the seat back assembly is arranged in a plane comprising the first side rail and the second side rail of the support frame after the fixing of the first pin.

Advantageously, this enables the first fixing element to be easily fixed to the seat back assembly as the first fixing element may be accessed with a tool such as a screw driver or socket wrench and be secured by the releasable fixings, whereas once the seat back assembly is in an upright position, the fixing holes are covered by the first side rail, thereby blocking access to the fixing holes.

The first fixing element may fit into a groove formed in the first pin. The first fixing element may comprise a recess, the sides of the recess engaging the groove in the first pin when the first fixing element is moved into an engaged position. The first fixing element may be retained in an engaged position by means of one or more releasable fastenings.

The second pin may be fixed in the second opening using a second fixing element. The seat back assembly may be more securely fixed relative to the support frame, if fixing elements are used on both the first and second pins.

The method may further comprise connecting a third pin connected to the support frame to a first lower seat fixing connected to the first side of the seat back assembly, and connecting a fourth pin connected to the support frame to a second lower seat fixing connected to the second side of the seat back assembly.

The first slot may be configured to receive the first pin at the first part of the first slot and retain the first pin at the second part of the first slot.

The first part of the slot may comprise an enlarged portion and the second part of the slot may comprise a narrower portion. The first pin may be provided with a flange which can enter the slot through only the enlarged portion, such that after the pin has entered the slot through the enlarged portion and is slid along the slot into the narrow portion, it is held captive in the slot by engagement of the flange with the narrow portion of the slot.

The enlarged portion of the slot may be at a first end of the slot and the narrow portion may comprise the remainder of the slot, such that the slot is substantially keyhole shaped. Thus, the pin may be more securely retained within the slot.

According to another aspect of the present disclosure, there is provided a seat assembly comprising a seat back assembly and a support frame, the support frame comprising a first side rail and a second side rail, the seat assembly further comprising a first pin connected to the first side rail of the support frame, a second pin connected to the second side rail of the support frame, the seat back assembly comprising a first opening formed in a first side of the seat back assembly for receiving the first pin, and a second opening formed in a second side of the seat back assembly opposite the first side for receiving the second pin, and a first fixing element which is configured to fix the first pin in position in the first opening.

The first fixing element may be secured by one or more releasable fixings. The first fixing element may comprise a pin retention plate.

The first opening may comprise a first slot configured to receive the first pin at a first part of the first slot and retain the first pin at a second part of the first slot, and the second slot may be configured to receive the second pin at a first part of the second slot and retain the second pin at a second part of the second slot.

The second pin may be fixed in the second opening using a second fixing element.

The seat assembly may further comprise a third pin connected to the first side rail of the support frame and a fourth pin connected to the second side rail of the support frame, and wherein the seat assembly may further comprise a first lower seat fixing connected to the first side of the seat back assembly and a second lower seat fixing connected to the second side of the seat back assembly, and wherein the third pin may be connected to the first lower seat fixing and the fourth pin may be connected to the second lower seat fixing.

The methods described herein relate to a configuration in which openings are provided in the seat back assembly, where pins connected to the support frame are inserted into the openings and secured at the seat back assembly in order to connect the support frame to the seat back assembly. However, it will be appreciated that alternative configurations are equally envisaged, in which the opening (and all the features which correspond to the opening) may be instead provided in the support frame, where the pins are instead initially connected to the seat back assembly and inserted into the openings of the support frame in the manner described above. The pins herein may be connectable or disconnectable from both the seat back assembly and the support frame.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which:

FIG. 2 illustrates a method of assembly according to an example;

DETAILED DESCRIPTION

As is described above, it is desirable to provide seat assemblies and methods of assembly thereof which enable efficient and easy installation of seats into vehicles such as aircraft.

Figure 1:
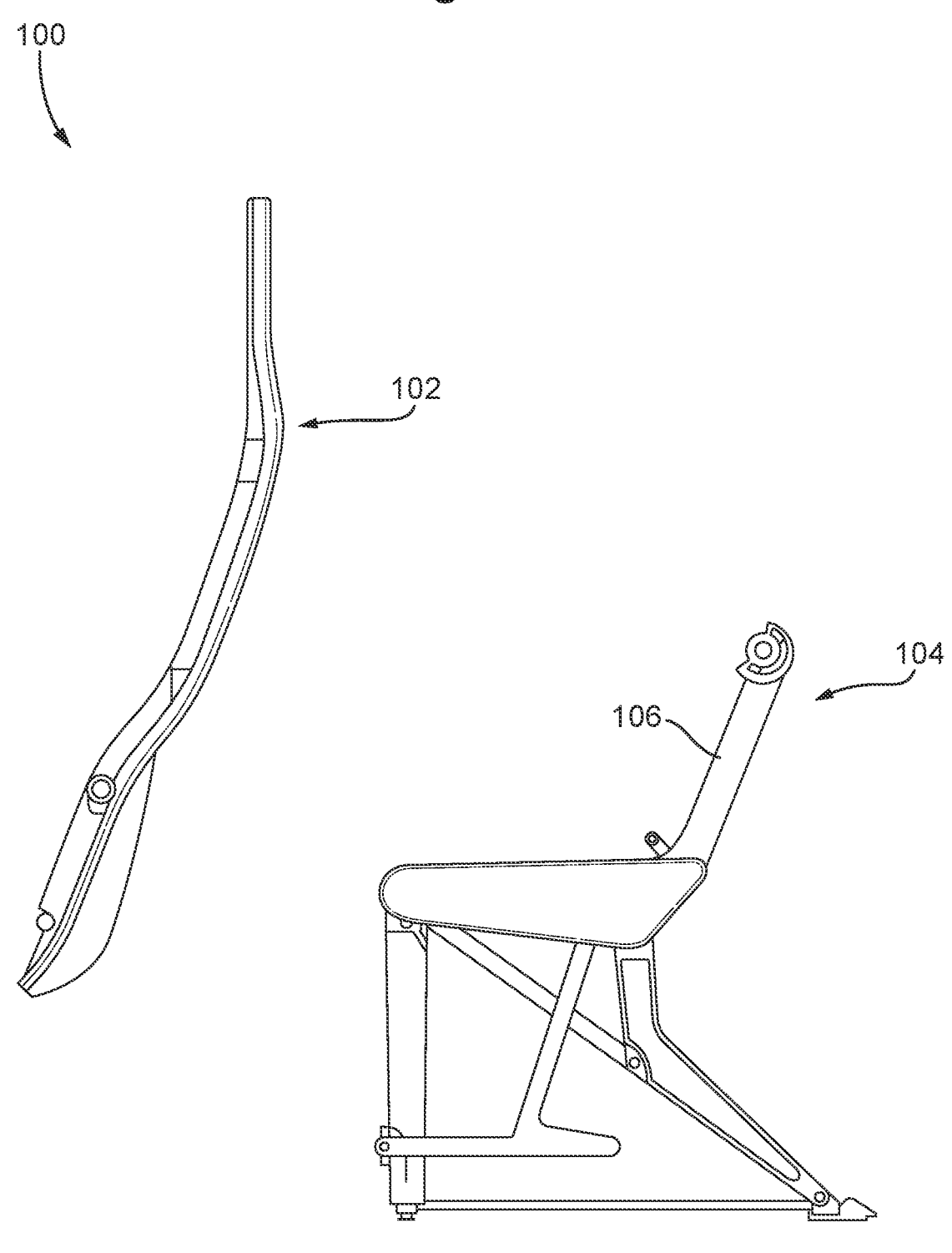
FIG. 1 illustrates a seat assembly to be assembled using the methods described herein.

FIG. 1 illustrates a seat assembly 100 comprising a seat back assembly 102 and support frame 104 according to an example. The support frame 104 comprises a first side rail 106 and a second side rail (not shown). The methods herein outline examples of methods of assembly for attaching the seat back assembly 102 to the support frame 104.

Figure 3A:
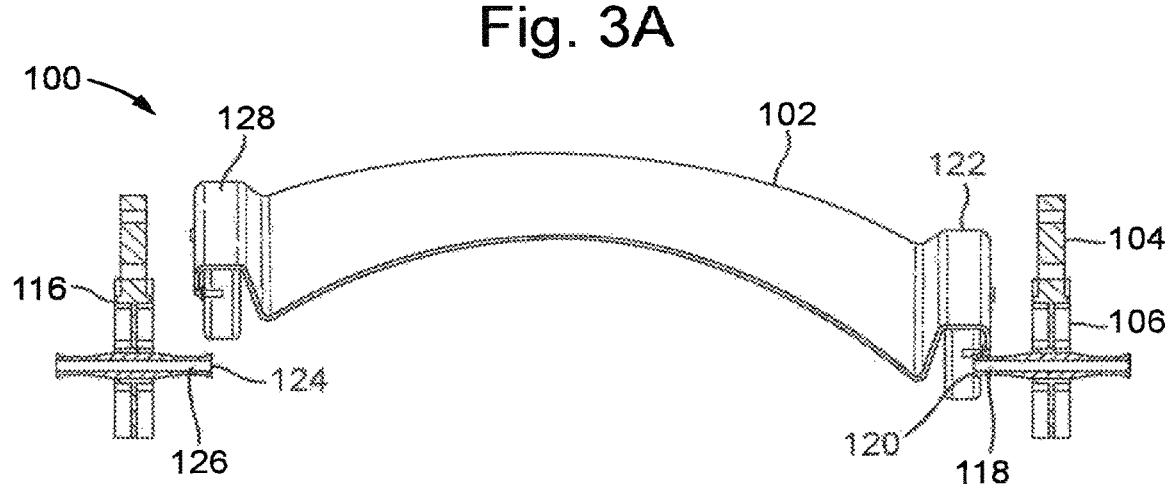
FIGS. 3A-C illustrate a method of assembly according to an example.
Figure 3B:
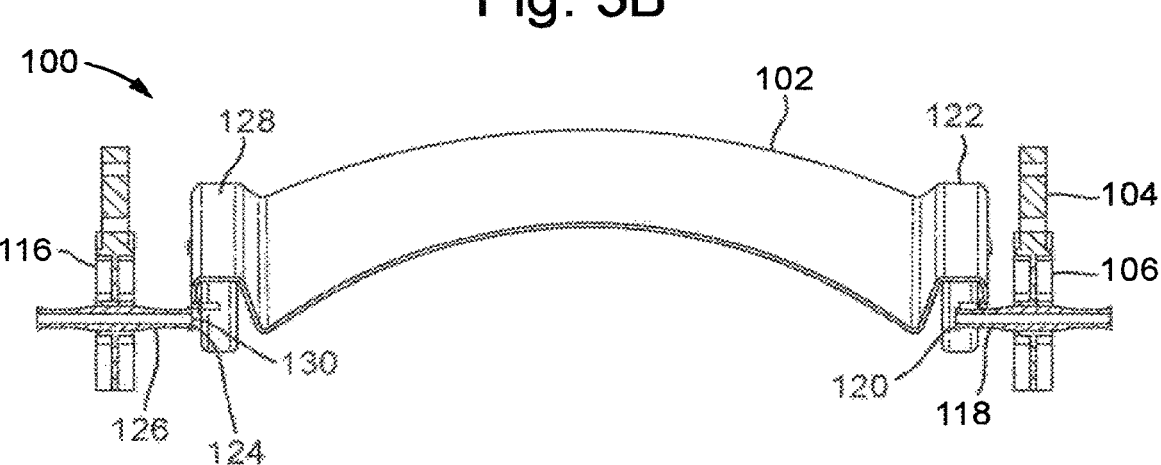
Figure 3C:
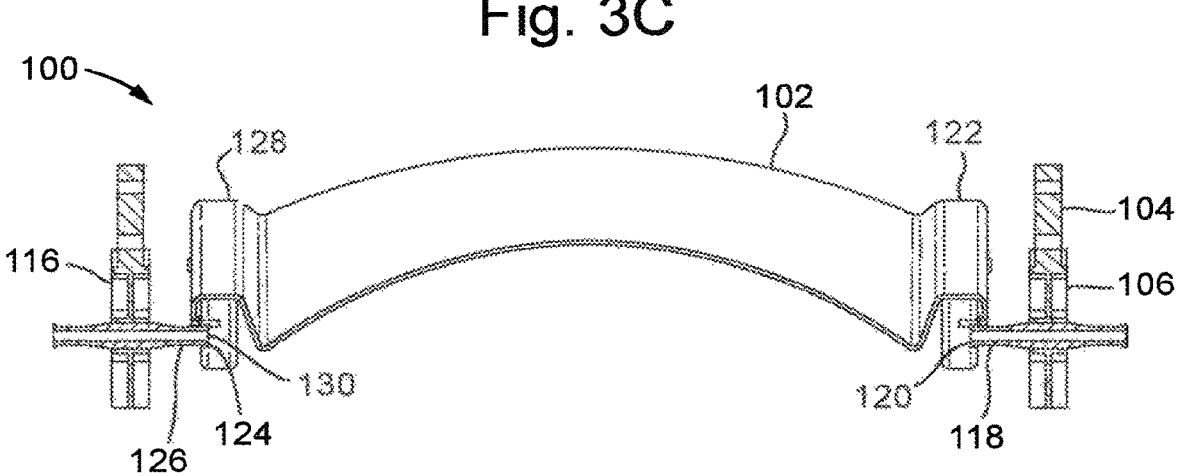

FIG. 2 outlines an example of a method of assembling a seat comprising the seat back and the support frame. FIGS. 3A-C are partial views of the seat assembly 100 showing steps in assembly. Referring to FIGS. 2 and 3A-C, the method comprises the steps of inserting a first pin 118 connected to the first side rail 106 into a first opening 120 formed in a first side of a seat back assembly 102 until a tip 124 of a second pin 126 connected to the second side rail 116 clears a second side of the seat back assembly 102 opposite to the first side, aligning the tip 124 of the second pin 126 with a second opening 130 formed in the opposite side of the seat back assembly 102, inserting the second pin 126 into the second opening such that the seat back assembly 102 is supported in the support frame 104 by the first and second pins 118, 126, and fixing the first pin 118 in the first opening 120 using a first fixing element comprising a retention plate 134 shown in FIGS. 4A-C.

The maneuvering of the seat assembly as outlined in FIG. 2 is shown in FIGS. 3A-C. In particular, FIGS. 3A-C illustrates a seat assembly 100 comprising a seat back assembly 102 and a support frame 104. The support frame comprises a first side rail 106 and a second side rail 116. FIG. 3A illustrates the first step of the method, in which a first pin 118 connected to the first side rail 106 is inserted into a first opening 120 formed in a first side 122 of the seat back assembly 102 until a tip 124 of a second pin 126 connected to the second side rail 116 clears a second side 128 of the seat back assembly 102 opposite to the first side.

FIG. 3B illustrates the second step of the method, in which the tip 124 of the second pin 126 is aligned with a second opening 130 formed in a second side 128 of the seat back assembly opposite to the first side 122.

FIG. 3C illustrates the third step of the method, in which the second pin 126 is inserted into the second opening 130. In this configuration, the seat back assembly 102 is supported by the first pin 118 and the second pin 126. It will be appreciated that the first pin 118 is over inserted in the first opening in the step corresponding to FIG. 3a, and the first pin is then withdrawn slightly from the first opening 120 as the second pin is inserted into the second opening 130.

Figure 4A:
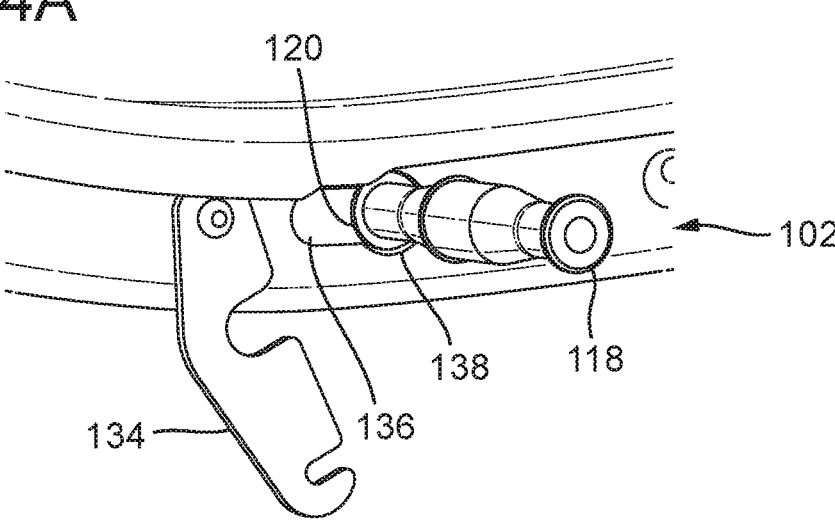
FIGS. 4A-C illustrate a method of assembly according to an example.
Figure 4B:
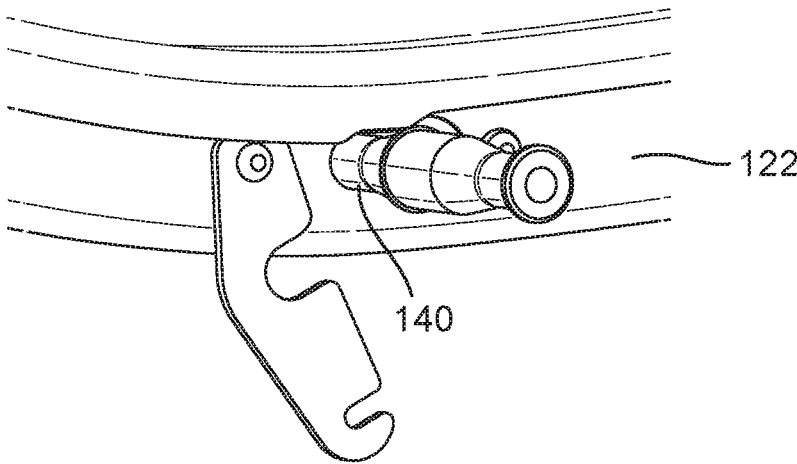
Figure 4C:
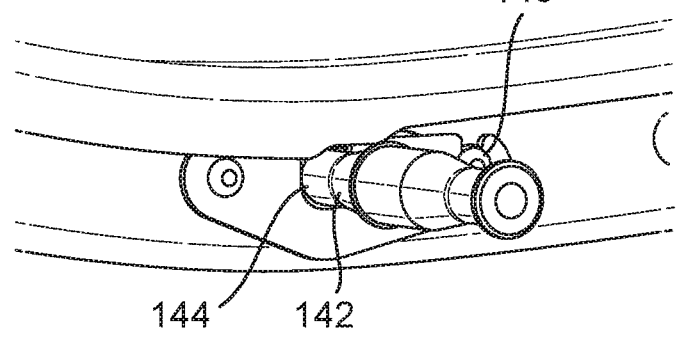

FIGS. 4A-C illustrate the steps involved in fixing the first pin 118 in the first opening 120 using a first fixing element comprising a pin retention plate 134.

FIG. 4A shows the configuration of the seat assembly after the pins have been inserted into their respective openings. As is shown in this Figure, the first opening may comprise a first slot 136. The first slot may be formed entirely in a lateral side wall of the seat back assembly 102. The first slot may comprise rounded edges to reduce the likelihood of crack initiation and propagation, thereby increasing the structural integrity and service life of the seat back assembly. The first opening may comprise a slot having a wider first part 138 and a narrower second part 140. For example, the slot may be keyhole shaped. The first pin 118 may have a portion of reduced diameter. For example, it may be formed with an annular recess or may have an enlarged tip/head as in the illustrated embodiment. The first pin can be inserted into the first part 138 of the first slot 136, but is held captive when in the second narrower part 140 of the first slot by engagement of the enlarged head of the first pin with a side wall of the narrower part 140 of the first slot, FIG. 4B illustrates a further step of the method, in which the seat back assembly 102 is moved so that the first pin 118 moves from the first part 138 of the first slot to the second part 140 of the first slot 136 in the first side 122 of the seat back assembly 102, so that the first pin 118 is held captive in the second part 140 of the slot 136.

FIG. 4C illustrates the next step of the method, in which the first pin 118 is fixed at the second part 140 of the first slot 136 by moving the first retention plate 134 into an engaged position.

As is shown in this Figure, the first retention plate 134 may fit into a groove 142 formed in the first pin 118. The first retention plate 134 may comprise a recess 144, the sides of the recess 144 engaging the groove 142 in the first pin 118 when the first retention plate 134 is moved into an engaged position. The first retention plate may be retained in an engaged position by means of a releasable fastening 146, such as a screw bolt or clip.

As is illustrated in this example, the first slot is configured to receive the first pin at the first part of the first slot and retain the first pin at the second part of the first slot. The first part of the slot comprises an enlarged portion and the second part of the slot may comprise a narrower portion and the first pin is provided with a flange which can enter the slot through only the enlarged portion, such that after the pin has entered the slot through the enlarged portion and is slid along the slot into the narrow portion, it is held captive in the slot by engagement of the flange with the narrow portion of the slot. The enlarged portion of the slot may be at a first end of the slot and the narrow portion may comprise the remainder of the slot, such that the slot is substantially keyhole shaped.

While not shown in this Figure, it will be appreciated that the second pin 126 may be fixed in the second opening 130 using a second fixing element which may comprise a second pin retention plate (not shown) in the same manner as described above for the first pin and the first pin retention plate.

The method may further comprise inserting the first pin and the second pin when the seat back assembly is arranged substantially perpendicular to the support frame.

Figure 5A:
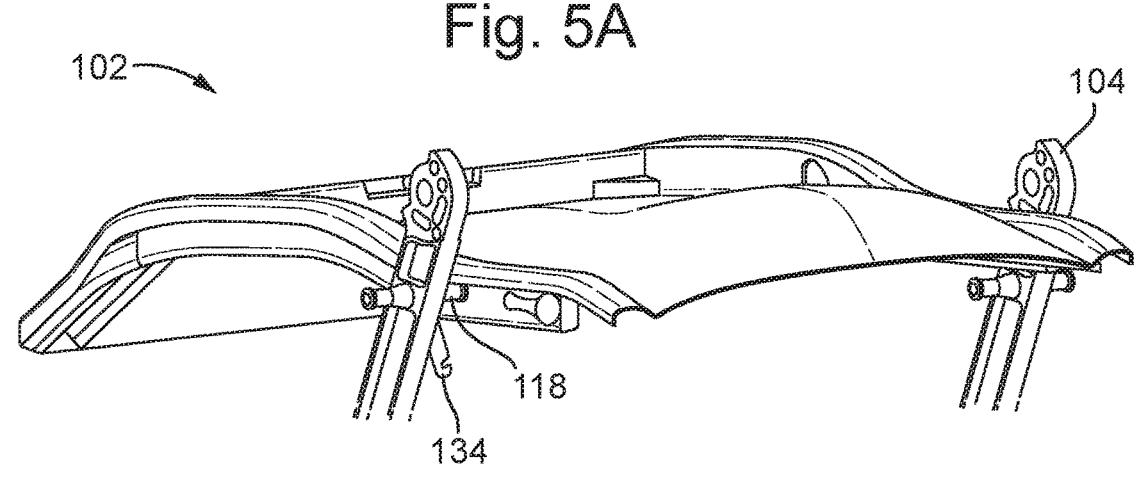
FIGS. 5A-B illustrate a method of assembly according to an example.
Figure 5B:
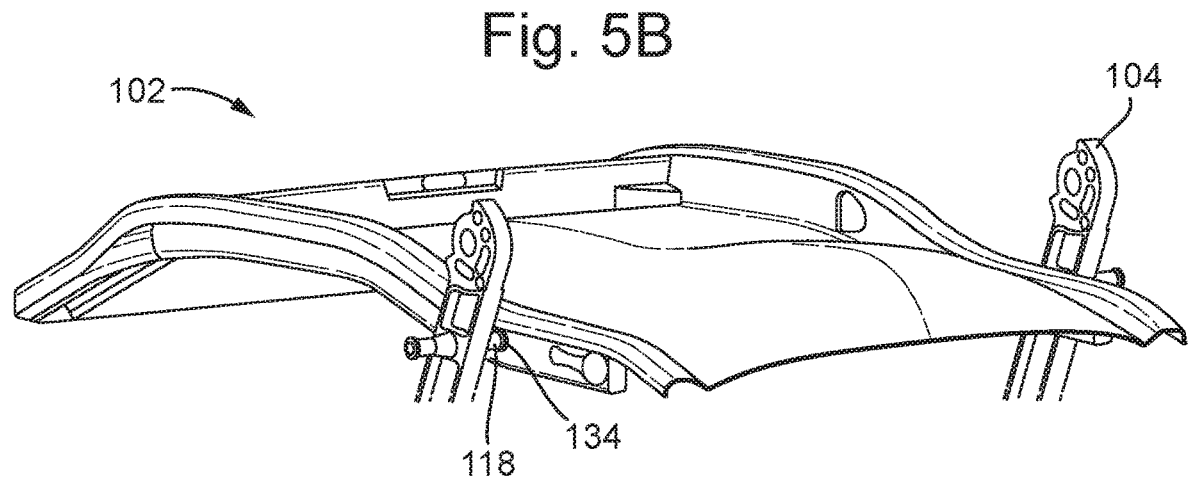

An example of this is shown in FIGS. 5A-B. In particular, FIGS. 5A-B illustrate a seat assembly comprising the support frame 104 and a seat back assembly 102, where the seat back assembly is arranged substantially perpendicular to the support frame, or in a substantially horizontal position. FIG. 5A corresponds to the configuration of FIG. 3a, in which the first pin 118 has been inserted into the respective slot. FIG. 5b then illustrates the configuration in which the second pin has been inserted into its respective slot and the seat back assembly has been moved so that the pins move in their respective slots from a first end to a second end. Once the pins are correctly seated in the respective slots, the first pin 118 can be fixed in position by the first retention plate 134.

Figure 6:
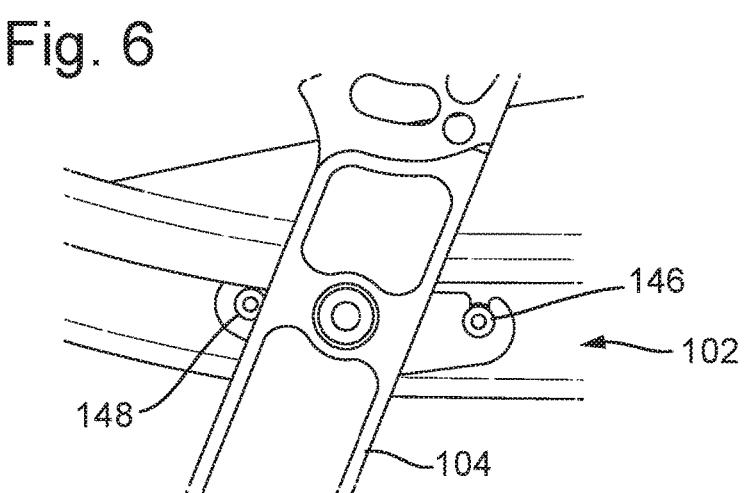
FIG. 6 illustrates the fixed retention plate according to an example.

FIG. 6 shows the configuration of the support frame 104 and the seat back assembly 102 once the first retention plate 134 has been fixed in place. As is shown in this example, the first retention plate 134 is retained in place by means of one or more releasable fastenings, which in this case comprises a first screw 146 and a second screw 148. As is further illustrated in this example, the relative orientation of the support frame 104 and the seat back assembly 102 enables the first retention plate 134 to be easily secured as the openings for securing the first retention plate 134 are not blocked by the support frame 104.

Once the first retention plate 134 is fixed in place, a second retention plate may also be fixed in place to secure the second pin 126.

It will be appreciated that the seat back assembly does not have to be rotated fully to a horizontal position in the above-mentioned method of assembly. In practice, the seat back assembly only needs to be rotated sufficiently from the upright/in use configuration that the frame is out of the way and there is easy access to the releasable fixings (e.g. the screws 146, 148). For example, there needs to be sufficient space for a screwdriver to access the screws 146, 148.

Subsequent to the fixing of the first retention plate, the seat back assembly is rotated to a substantially upright position in which the seat back assembly is arranged substantially in a plane comprising the first side rail and the second side rail.

Figure 7:
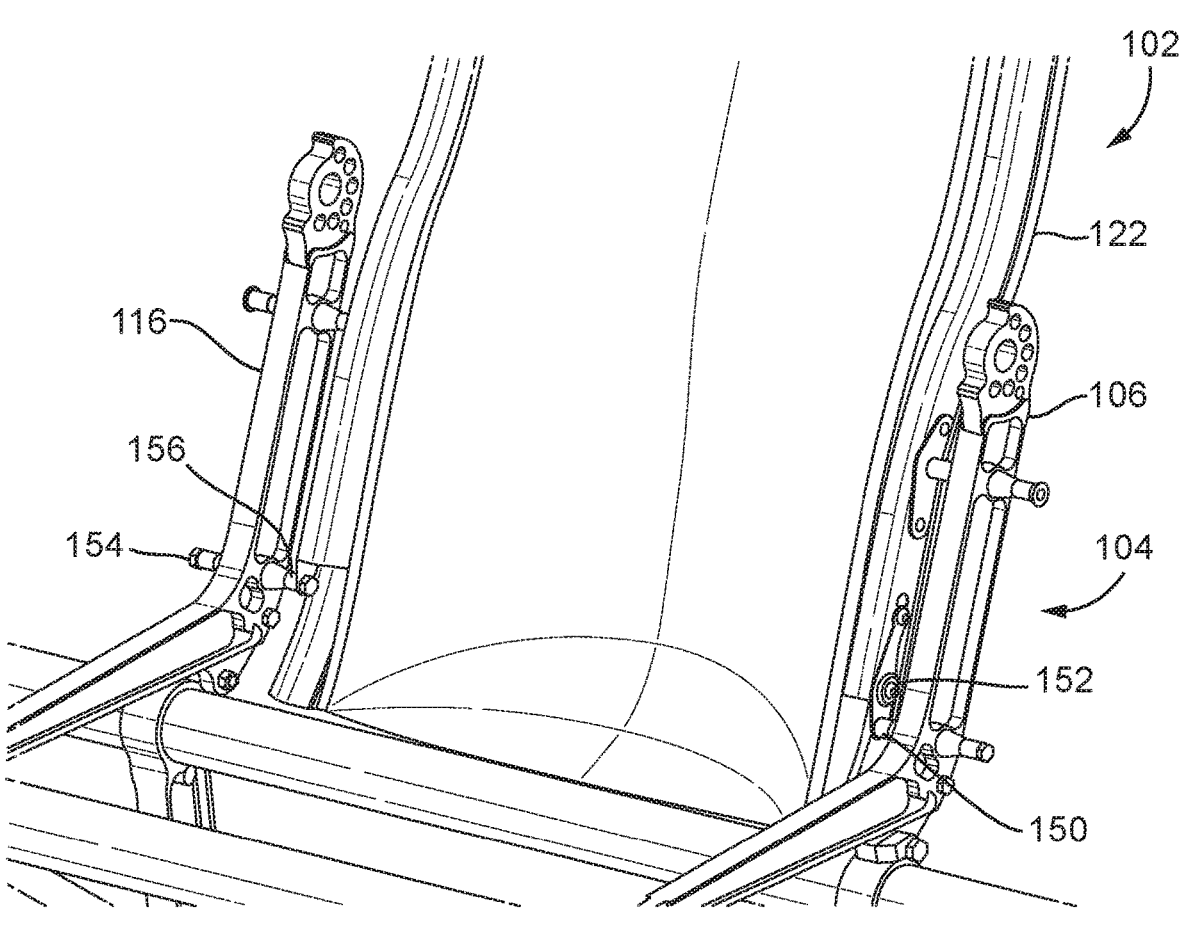
FIG. 7 illustrates an assembled seat according to an example.

An example of this is shown in FIG. 7, which illustrates the seat back assembly 102 in a substantially upright position, where the first side rail 106 and the second side rail 116 of the support frame 104 are situated in substantially the same plane as the seat back assembly 102.

Once the seat back assembly 102 is in the upright position, the method further comprises connecting a third pin 150 connected to the (first side rail of the) support frame to a first lower seat fixing 152 connected to the first side 122 of the seat back assembly 102, and connecting a fourth pin 154 connected to the (second side rail of the) support frame 104 to a second lower seat fixing 156 connected to the second side 128 of the seat back assembly 102. Thus, the seat back assembly is fixed in an upright position.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A seat assembly comprising a seat back assembly and a support frame, the support frame comprising a first side rail and a second side rail, the seat assembly further comprising:
    a first pin connected to the first side rail of the support frame the first pin having a portion of reduced diameter;
    a second pin connected to the second side rail of the support frame;
    the seat back assembly comprising a first opening formed in a first side of the seat back assembly for receiving the first pin, and a second opening formed in a second side of the seat back assembly opposite the first side for receiving the second pin, wherein the first opening comprises a first slot formed entirely in a lateral facing side wall of the seat back assembly and has a narrow part and a wider part, the first slot being configured to receive the first pin through the wider part and retain the first pin by engagement of the portion of the pin of reduced diameter in the narrower part of the first slot; and
    a first fixing element which fixes the first pin in position in the narrower part of the first slot.

2. The seat assembly as claimed in claim 1, wherein the second opening comprises a second slot and the second slot is configured to receive the second pin at a first part of the second slot and retain the second pin at a second part of the second slot.

3. The seat assembly as claimed in claim 2, wherein the second pin is fixed in the second opening using a second fixing element.

4. The seat assembly as claimed in claim 1, wherein the seat assembly further comprises a third pin connected to the first side rail of the support frame and a fourth pin connected to the second side rail of the support frame, and wherein the seat assembly further comprises a first lower seat fixing connected to the first side of the seat back assembly and a second lower seat fixing connected to the second side of the seat back assembly, and wherein the third pin is connected to the first lower seat fixing and the fourth pin is connected to the second lower seat fixing.

5. The seat assembly as claimed in claim 1, wherein the seat assembly further comprises a third pin connected to the first side of the seat back assembly and a fourth pin connected to the second side of the seat back assembly, and wherein the seat assembly further comprises a first lower seat fixing connected to the first side of the support frame and a second lower seat fixing connected to the second side of the support frame, and wherein the third pin is connected to the first lower seat fixing and the fourth pin is connected to the second lower seat fixing.

6. The seat assembly as claimed in claim 1, wherein the portion of reduced diameter comprises an annular recess formed in the first pin.

7. A seat assembly comprising a seat back assembly and a support frame, the support frame comprising a first side rail and a second side rail, the seat assembly further comprising:
  a first pin connected to a first side of the seat back assembly, the first pin having a portion of reduced diameter;
  a second pin connected to a second side of the seat back assembly;
  the support frame comprising a first opening formed in a first side of the support frame for receiving the first pin, and a second opening formed in a second side of the support frame opposite the first side for receiving the second pin, wherein the first opening comprises a first slot formed entirely in a lateral facing side wall of the support frame and has a narrow part and a wider part, the first slot being configured to receive the first pin through the wider part and retain the first pin by engagement of the portion of the pin of reduced diameter in the narrower part of the first slot; and
  a first fixing element which fixes the first pin in position in the narrower part of the first slot.

8. The seat assembly as claimed in claim 7, wherein the second opening comprises a second slot and the second slot is configured to receive the second pin at a first part of the second slot and retain the second pin at a second part of the second slot.

9. A method of assembling a seat comprising a seat back assembly and a support frame, the support frame comprising a first side rail and a second side rail, the method comprising:
  inserting a first pin connected to the first side rail into a first opening formed in a first side of the seat back assembly, wherein the first pin is over inserted until a tip of a second pin connected to the second side rail clears a second side of the seat back assembly opposite to the first side;
  aligning the tip of the second pin with a second opening formed in a second side of the seat back assembly opposite to the first side;
  inserting the second pin into the second opening such that the seat back assembly is supported for rotation in the support frame by the first and second pins and such that the first pin is withdrawn slightly from the first opening; and fixing the first pin in position in the first opening using a first fixing element.

10. The method as claimed in claim 9, wherein the first opening comprises a first slot, the first pin being inserted into a first part of the first slot and wherein, prior to the fixing step, the method further comprises:
  moving the seat back assembly so that the first pin moves from the first part of the first slot to a second part of the first slot in the first side of the seat back assembly; and
  wherein the method further comprises fixing the first pin at the second part of the first slot by moving the first fixing element into an engaged position.

11. The method as claimed in claim 9, further comprising inserting the first pin and the second pin when the seat back assembly is arranged substantially perpendicular to the first side rail and the second side rail of the support frame, and rotating the seat back assembly to a substantially upright position in which the seat back assembly is arranged in a plane comprising the first side rail and the second side rail of the support frame after the fixing of the first pin.

12. The method as claimed in claim 9, wherein the first fixing element fits into a groove formed in the first pin.

13. The method as claimed in claim 12, wherein the first fixing element comprises a recess, the sides of the recess engaging the groove in the first pin when the first fixing element is moved into an engaged position.

14. The method as claimed in claim 9, wherein the first fixing element is retained in an engaged position by means of a releasable fastening.

15. The method as claimed in claim 9, wherein the second pin is fixed in the second opening using a second fixing element.

16. The method as claimed in claim 9, further comprising connecting a third pin connected to the support frame to a first lower seat fixing connected to the first side of the seat back assembly, and connecting a fourth pin connected to the support frame to a second lower seat fixing connected to the second side of the seat back assembly.

17. The method as claimed in claim 10, wherein the first slot is configured to receive the first pin at the first part of the first slot and retain the first pin at the second part of the first slot.

18. The method as claimed in claim 9, wherein the first part of the slot comprises an enlarged portion and the second part of the slot comprises a narrower portion and the first pin is provided with a flange which can enter the slot through only the enlarged portion, such that after the pin has entered the slot through the enlarged portion and is slid along the slot into the narrow portion, it is held captive in the slot by engagement of the flange with the narrow portion of the slot.

19. The method as claimed in claim 9 or 10, wherein the enlarged portion of the slot is at a first end of the slot and the narrow portion comprises the remainder of the slot, such that the slot is substantially keyhole shaped.

20. A method of assembling a seat comprising a seat back assembly and a support frame, the support frame comprising a first side rail and a second side rail, the method comprising:
  inserting a first pin connected to a first side of the seat back assembly into an opening formed in a first side of the support frame, wherein the first pin is over inserted until a tip of a second pin connected to a second side of the seat back assembly clears a second side of the support frame;
  aligning the tip of the second pin with a second opening formed in a second side of the support frame opposite to the first side;

inserting the second pin into the second opening such that the seat back assembly is supported for rotation in the support frame by the first and second pins and such that the first pin is withdrawn slightly from the first opening; and fixing the first pin in position in the first opening using a first fixing element.

* * * * *